United States Patent [19]

Knorpp, deceased et al.

[11] Patent Number: 4,947,387
[45] Date of Patent: Aug. 7, 1990

[54] SWITCHING NODE FOR SWITCHING DATA SIGNALS TRANSMITTED IN DATA PACKETS

[75] Inventors: Eberhard Knorpp, deceased, late of Bieberach/Riss, by Gustav Knorpp, executor; Peter Rau, Munich; Anton Kammerl, Groebenzell, all of Fed. Rep. of Germany

[73] Assignee: Siemens Aktiengesellschaft, Berlin and Munich, Fed. Rep. of Germany

[21] Appl. No.: 269,519

[22] Filed: Nov. 10, 1988

[30] Foreign Application Priority Data

Nov. 10, 1987 [DE] Fed. Rep. of Germany ....... 3738177

[51] Int. Cl.$^5$ .......................................... H04Q 11/04
[52] U.S. Cl. .................................................. 370/60
[58] Field of Search ....................... 370/60, 54, 58, 63, 370/64, 59

[56] References Cited

U.S. PATENT DOCUMENTS

| | | | |
|---|---|---|---|
| 4,486,878 | 12/1984 | Havermans | 370/60 |
| 4,491,945 | 1/1985 | Turner | 370/60 |
| 4,598,400 | 7/1986 | Hillis | 370/60 |
| 4,730,305 | 3/1988 | Acampora et al. | 370/60 |
| 4,796,254 | 1/1989 | van Baardwijk et al. | 370/60 |
| 4,837,761 | 6/1989 | Isono et al. | 370/60 |

FOREIGN PATENT DOCUMENTS 8602510 4/1986 European Pat. Off.

OTHER PUBLICATIONS

Akiyama et al.; Mesh Type Distributed Packet Switching Systems; Feb. 1985; Trans IECE of Japan; vol. E68, No. 2; pp. 59–64.

Terada; Packet Exchange System; Patent Abstracts of Japan; vol. 5, No. 181 (E–83); Nov. 20, 1981; p. 853 (Pat. Pub. No.: 56–110370).

Wright et al.; Fault Tolerant Techniques for a Multiple Microprocessor-Based . . . ; Natl. Telecomm. Conf.; vol. 2; Nov. 1981; p. C4.2.1.

U.S. patent application Ser. No.: 07/269,520; Niestegge; filed Nov. 10, 1988; Atty. Dkt. No.: VPA 87 P 1834.

Primary Examiner—Douglas W. Olms
Assistant Examiner—Wellington Chin
Attorney, Agent, or Firm—Jeffrey P. Morris; David N. Caracappa

[57] ABSTRACT

With the switching node at least one coupling element is associated which has a number n of input lines and n output lines optionally connectible to the input lines via a space switch with a buffer store being assigned to the input lines in which k data packets occurring sequentially on the particular input line are storable before being routed further to the output lines indicated by the address signals contained in the particular data packet. The buffer stores have each a plurality $m \leq k$ output terminals via which simultaneously m data packets stored in the particular buffer store and to be routed further to m different output lines are suppliable to a space switch having $m \times n$ input terminals and n output terminals.

3 Claims, 4 Drawing Sheets

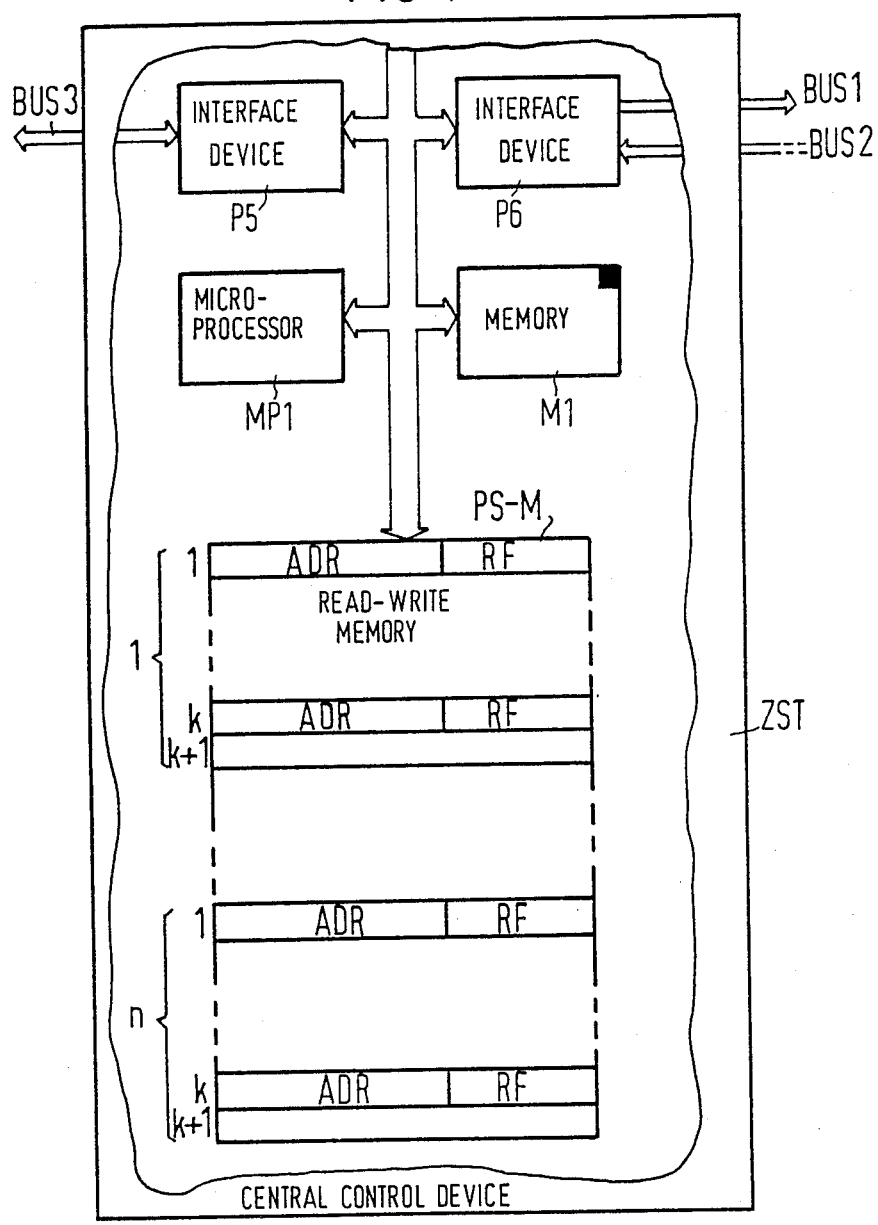

SWITCHING NODE FOR SWITCHING DATA SIGNALS TRANSMITTED IN DATA PACKETS

The present invention relates to a switching node for switching data signals transmitted in data packets. The switching node includes at least one coupling element which has n input lines and n output lines. The output lines are selectively coupled to the input lines via a space switch. Each of the input lines has a buffer store associated with it. A plurality of k data packets, occurring sequentially on an input line, can be stored in the associated buffer store before being routed further to the selected output line, as denoted by the address signal contained in the particular data packet.

In known switching nodes such as are known from, for example, U.S. Pat. No. 4,491,945, issued Jan. 1, 1985 to Turner, the buffer stores assigned to the input lines have in each instance only a single output terminal. Because of this, at any given point in time, a data packet can only be transferred from the buffer store to the space switch. This results in different waiting times (before being switched) for the individual data packets received in a buffer store as a function of the number of previously received data packets. These waiting times vary widely, expecially if data packets with variable length are switched via the switching node.

It is desirable that a switching node of the above-described type be able to decrease the previously mentioned waiting times, and the waiting time fluctuations for the data packets stored in the buffer stores.

In accordance with principles of the present invention, a switching node of the above-described type includes buffer stores each of which have a plurality $m \leq k$ output terminals via which m data packets, stored in the particular buffer store and to be routed further to m different output lines, are simultaneously supplied to a space switch having $m \times n$ inputs and n output terminals.

A switching node in accordance with the present invention has the advantage that the transit time of the data packets or the fluctuations of the transit time through the switching node due to the waiting time of the data packets in the individual buffer stores, is reduced. This is because a plurality of data packets can simultaneously be supplied to the space switch from the individual buffer stores.

In the drawing:

FIG. 4 is a circuit block diagram of a central control device which may be used in the coupling element illustrated in FIG. 1.

Figure 1:
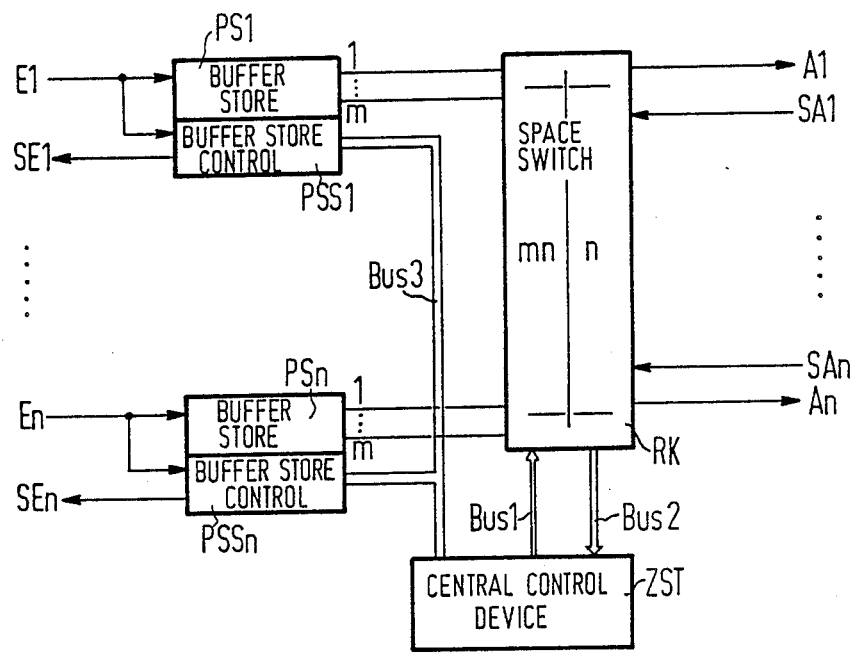
FIG. 1 is circuit block diagram of a coupling element in accordance with the present invention.

In FIG. 1 a coupling element of a switching node is represented in the form of a block circuit diagram. Only those circuit parts required for comprehension of the present invention are shown.

The coupling element has n input lines E1 to En of which only input lines E1 and En are shown. The input lines may be connected with terminal devices (not shown) or with output lines transmitting data packets from one or several upstream coupling elements of the switching node (also not shown). Each of the input lines (E1 to En) is associated with a buffer store in which k successive data packets can be stored. The buffer store associated with the input lines E1 and En is designated by PS1 and PSn, respectively. Each of the buffer stores (PS1 to PSn) is controlled by a respective buffer store control device connected to the associated input line. The buffer store control device assigned to buffer stores PS1 and PSn is designated PSS1 and PSSn, respectively. Each of the buffer store control devices (PSS1 to PSSn) has a control line which, for the buffer store control devices PSS1 and PSSn, is designated SE1 and SEn, respectively.

The buffer stores PS1 to PSn each have a plurality of $m \leq k$ outputs terminals, designated 1, ... m, which are routed to a space switch RK. This space switch is provided with $m \times n$ input terminals, corresponding to the $n \times m$ output terminals of the buffer stores, and n output terminals, connected to output lines A1 to An which may be connected to end devices (not shown) for receiving data packets or to input lines of one or several downstream coupling elements of the switching node (also not shown). A plurality of control lines, which are designated SA1 to SAn, are respectively associated with the output lines (A1 to An) of the space switch.

To control the setting of the space switch RK, a central control device ZST is connected to it via two unidirectional bus line systems BUS1 and BUS2, for example, in the form of a microprocessor configuration. This central control device ZST, in addition, is connected via a bidirectional bus line system BUS3 to the buffer store control devices PSS1 through PSSn.

In operation, the assumption is made that each of the data packets supplied to the coupling element by the individual input lines E1 through En is associated with a virtual connection and includes an address signal which designates the output line of the coupling element selected for the particular virtual connection. These data packets may optionally be preprocessed appropriately by, for example, devices preceding the coupling element. The individual data packets may be variable with respect to their length up to a predetermined maximum length.

The data packets supplied sequentially to the coupling element, for example, by the input line E1, are placed into intermediate storage in buffer store PS1 before being routed further by the coupling element. This temporary storage takes place under the control of buffer store control device PSS1 which, upon the arrival of a data packet, selects a free storage area of buffer store PS1 for the temporary storage of the particular data packet. After the temporary storage of a data packet in the buffer store PS1, the buffer store control device PSS1 supplies the address signal included in this data packet, together with the address of the storage area in which the just received data packet is stored, to the central control device ZST, via the bus line system BUS3.

The same processes also take place in the remaining buffer stores (PS2 to PSn) and buffer store control devices (PSS2 to PSSn) with respect to the intermediate storage of data packets arriving on input lines E2 to En, respectively.

The central control device ZST manages the data packets waiting in the buffer stores PS1 to PSn (to be routed further via the space switch RK) on the basis of the information transmitted to it by the individual buffer store control devices PSS1 to PSSn. Further routing of the data packets via the space switch RK takes place synchronously. Successive time intervals are defined determined initially by packet clocks. These intervals may correspond, for example, to the maximum time duration of a data packet of the predetermined maximum length. The central control device ZST, in response to the information supplied to it by the buffer store control devices PSS1 to PSSn, selects n data packets for routing to the n output terminals of the space switch RK. The space switch is correspondingly set via the bus line system BUS1. To this end, n selected input terminals of the m×n total available input terminals of space switch RK are connected by cross-points to corresponding output lines A1 to An.

After setting space switch RK, the central control device ZST then sequentially sends to the appropriate buffer store control devices (PSS1 to PSSn), at a time determined by a packet clock, the storage addresses in the associated buffer stores at which the selected data packets are stored, via BUS3. A buffer store control device (PSS1 to PSSn) may receive up to m storage addresses, corresponding to the number of output terminals of the associated buffer store. The particular buffer store control device (PSS1 to PSSn) accesses its associated buffer store (PS1 to PSn, respectively) according to the storage address or storage addresses which the associated buffer store control device (PSS1 to PSSn) received. The buffer control device (PSS1 to PSSn) then causes the buffer store (PS1 to PSn) to transmit one or several data packets, through an appropriate number of read commands. The output terminal of the buffer store (PS1 to PSn) to be used for each of the transmitted packets is determined from information from the central control device ZST included with each of the storage addresses. The control of the further routing of data packets by the central control device ZST takes place in such a manner that the sequence of the arrival of the individual data packets is taken into consideration. In this manner, a loss of data packets or unordering of sequential data packets belonging to a single virtual connection is avoided.

The central control device ZST, furthermore, also manages the work-load of the individual buffer stores PS1 to PSn. For example, upon reaching a predetermined level of filling of one of the buffer stores (for example, of buffer store PS1), the central control device ZST conditions the buffer store control device associated with the particular buffer store (for example, the buffer store control device PSS1), to produce a control signal on the associated control line (SE1). Through such a control signal, the device connected with the particular input line (for example, E1), is conditioned to temporarily interrupt the transmission of any further data packets. The reception of data packets by the particular buffer store may be renewed, for example, through the removal of the just cited control signal.

The central control device ZST also receives control signals occurring on the already stated control lines SA1 to SAn from the space switch RK via the bus line system BUS2. The control signals indicate that transmission of a data packet the associated one of the output lines A1 to An is not possible due to an overload of the receiving device connected to the particular output line. As mentioned above already, such a device may be either an end device or a succeeding coupling element of the switching node.

Above, the assumption was made that each of buffer store PS1 to PSn has $m \leq k$ output terminals. If the number of output terminals per buffer store is selected to be, for example, m=2, then the capacity of the described coupling element to put data packets through can be increased by between 60% to 90% compared to a coupling with buffer stores each having only one output terminal. This through-put capacity, however, can be increased still further by further increasing the number of output terminals per buffer store.

Figure 2:
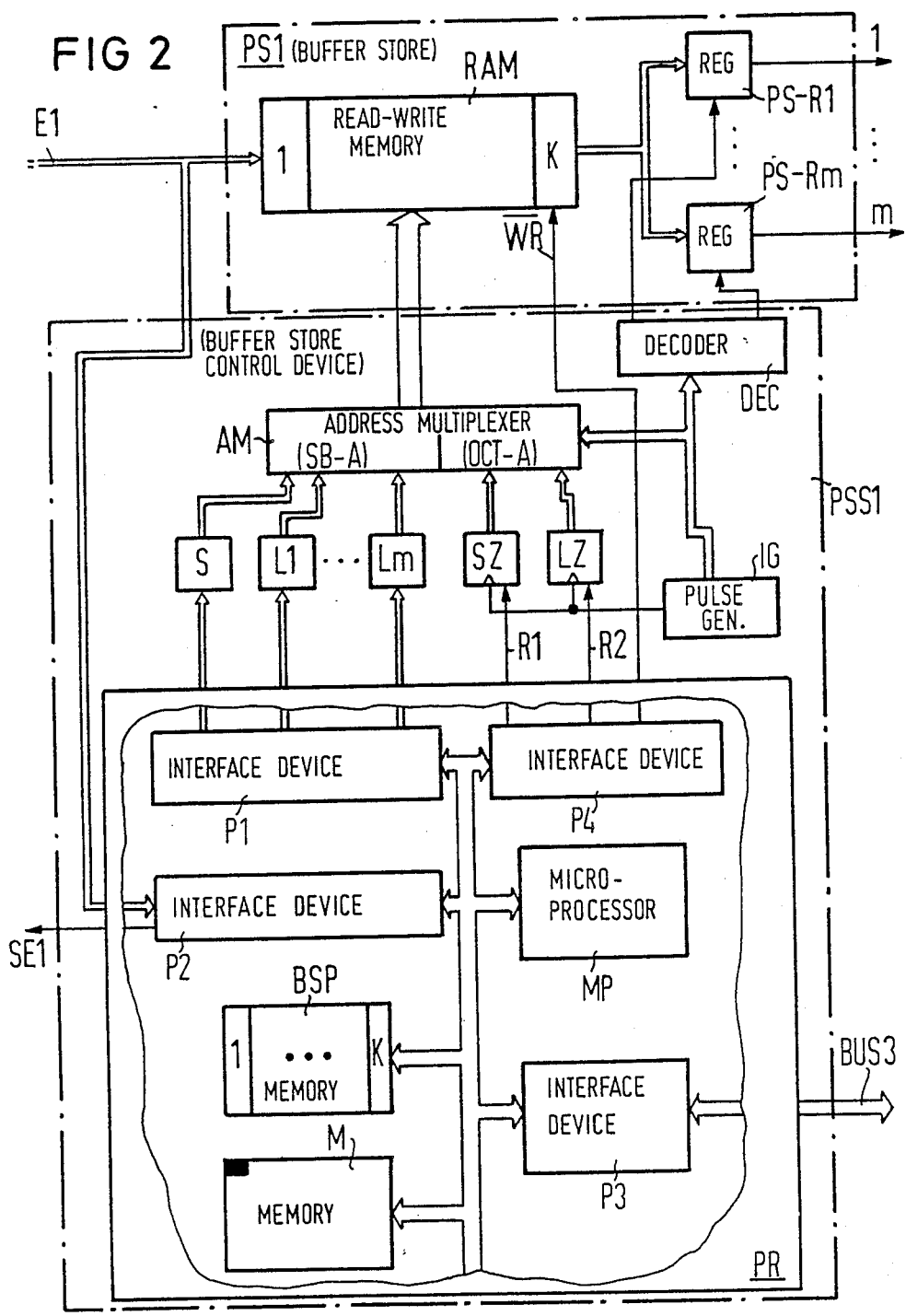
FIG. 2 is a more detailed circuit block diagram of a buffer store, and a buffer store control device connected to it, which may be used in the coupling element illustrated in FIG. 1.

In FIG. 2, a possible structure of a buffer store and buffer store control device, as illustrated in FIG. 1 is given using the buffer store PS1 and the buffer store control device PSS1 as example. It is assumed that, as already mentioned above, the individual data packets are preprocessed by a device preceding the buffer store in such a way that each has an address signal included with it through which one of the output lines of the coupling element is designated. The input line E1, connected to buffer store PS1 and shown only schematically in FIG. 1, may be implemented as a multibit digital bus line with a plurality of individual lines of which a first portion is used for transmission of sequential eight bit bytes of the data packets and another portion for the transmission of the address signals.

The buffer store PS1 has a read-write (random access) memory RAM which is connected on the input-side to the portion of the individual lines of the multibit digital bus line E1 carrying the 8 bit bytes of the data packets. This RAM contains a total of k storage areas, which may be numbered 1 to k, in each of which 8 bit bytes of a data packet can be stored in successive storage cells. On the output side of the read-write memory RAM, m parallel-to-serial registers PS-R1 to PS-Rm are connected. These registers, which form the output terminals 1 to m of buffer store PS1 (as illustrated in FIG. 1), are accessible individually via a respective control input terminal, and receive an 8 bit byte from the output terminal of the read-write memory RAM, which was produced by a read process of the read-write memory RAM. As will be explained below, in the course of a single control cycle, an 8 bit byte can be received into each of the m parallel-to-serial registers. These 8 bit bytes are subsequently simultaneously further routed serially to the space switch RK.

To control of the read-write memory RAM, an address multiplexer AM in the buffer store control device PSS1 is connected to the address input terminals of the read-write memory RAM. This address multiplexer AM is subdivided into two sections: SB-A and OCT-A. Connected to section SB-A is a register S, for storing a store area address to be used for write processes, and m registers L1 to Lm, for storing respective storage area addresses to be used for read processes. Registers L1 to Lm are associated with the buffer store PS1 output terminals labeled 1 to m, respectively. To section OCT-A is connected, in contrast, a byte counter SZ, for write processes, and a byte counter LZ, for read processes. These 8 bit byte counters each have a counting period corresponding to the maximum number of 8 bit bytes contained in a data packet and are clocked by a pulse generator IG. This pulse generator, moreover, also supplies the address multiplexer AM and a decoder DEC with setting signals in the course of a control cycle. Decoder DEC has m output terminals which are connected to the above cited control input terminals of the parallel-to-serial registers PS-R1 to PS-Rm.

Buffer control device PSS1, also includes a processor PR which is formed, for example, from a microprocessor configuration. This microprocessor configuration includes a microprocessor MP to whose bus system a storage arrangement comprising the memories BSP and M as well as four interface devices P1 to P4 are connected. Memory M functions in known manner as working and program storage. Memory BSP includes storage cells 1 to k in which are stored the actual states of occupancy of storage areas 1 to k of the read-write memory RAM are stored.

At the interface device P1, the previously cited registers S and L1 to Lm are connected at the input side. Interface device P2 is connected to the multibit parallel digital line E1, and to the line SE1, given in FIG. 1. The buffer store control device PSS1 is coupled to the bus line system BUS3 (represented in FIG. 1) via interface device P3. Lastly, from interface device P4, a line denoted by WR !! is coupled to the read-write memory RAM, and reset lines R1 and R2 are coupled to 8 bit byte counters SZ and LZ, respectively. Write pulses are sent to read-write memory RAM via the WR !! line.

In the previously described memory BSP, the actual occupancy of the storage areas of the read-write memory RAM is stored. On the basis of this occupancy information, the microprocessor MP determines a non-occupied storage area in which a data packet occurring subsequently on multibit digital signal line E1 is to be stored. The starting address of this storage area is subsequently sent into register S.

Upon the occurrence of a data packet on multibit digital signal line E1, which is recognized by the microprocessor on the basis of the packet head, the already cited pulse generator IG sends a setting signal to the address multiplexer AM via a line configuration S. Through this setting signal, the address multiplexer AM is controlled in such a way that it supplies the previously cited starting address stored in register S and an initial count of 8 bit byte counter SZ to the read-write memory RAM as address signals. This initial counter count is set through a reset signal on reset line R1. In addition, microprocessor MP sends write pulses to the read-write memory via line WR !!. On the basis of the occurrence of these write pulses, and an incrementation of the actual counter count of 8 bit byte counter SZ connected therewith, the individual 8 bit bytes of the just occurring data packet are stored sequentially in storage cells of the read-write memory. After complete storage of the data packet, the memory BSP, present in processor PR, is updated and, in preparation for the renewed reception of a data packet, a starting address of a free storage area of the read-write memory RAM is sent into register S. Moreover, as already stated above, the address signals included with the data packet on multibit digital signal line E1 and the starting address of the just used storage area of the read-write memory RAM are routed to the central control device ZST via the bus line system BUS3.

Furthermore, as mentioned above, the central control device ZST, at fixed time intervals, successively routes n control data signals to selected buffer store control devices (PSS1 to PSSn) via the bus line system BUS3 in order to include each associated buffer store in a transmission of data packets via the space switch RK. Each of these control data signals includes the starting address of that storage area of the read-write memory RAM in which the data block to be transmitted is stored. The control data signals also contains the output terminal of the particular buffer store to be used for the transmission. For example, the buffer store control device PSS1 shown in FIG. 2 may receive up to m control data signals corresponding to the number of output terminals present in the associated buffer store PS1. Upon reception of these control data signals, the cited starting addresses are sent, on the basis of the output terminal selection, into registers L1 to Lm.

Subsequently, a control cycle is carried out by the buffer store control device PSS1 which extends over the duration of the just started time interval and is subdivided into a number of subcycles corresponding to the maximum number of 8 bit bytes which may be contained in a data packet. In each of these subcycles setting signals are successively routed from pulse generator IG to the address multiplexer AM and the decoder DEC via the line configuration S. Through these setting signals the starting addresses stored in registers L1 to Lm and the current counter count of 8 bit byte counter LZ are made available as address signals to the read-write memory RAM for reading out 8 bit bytes in time division multiplex operation. The 8 bit byte counter assumes its initial counter count at the beginning of the control cycle through a reset signal on reset line R2. At the end of each subcycle then, starting from the initial counter count, the current counter count is incremented.

In each of the just described subcycles, m 8 bit bytes are read out from m different data blocks and supplied to the parallel-to-serial registers PS-R1 to PS-Rm. These registers are activated successively via decoder DEC for the reception of an 8 bit byte. After receiving this 8 bit byte, a simultaneous serial transmission to the space switch RK takes place.

Figure 3:
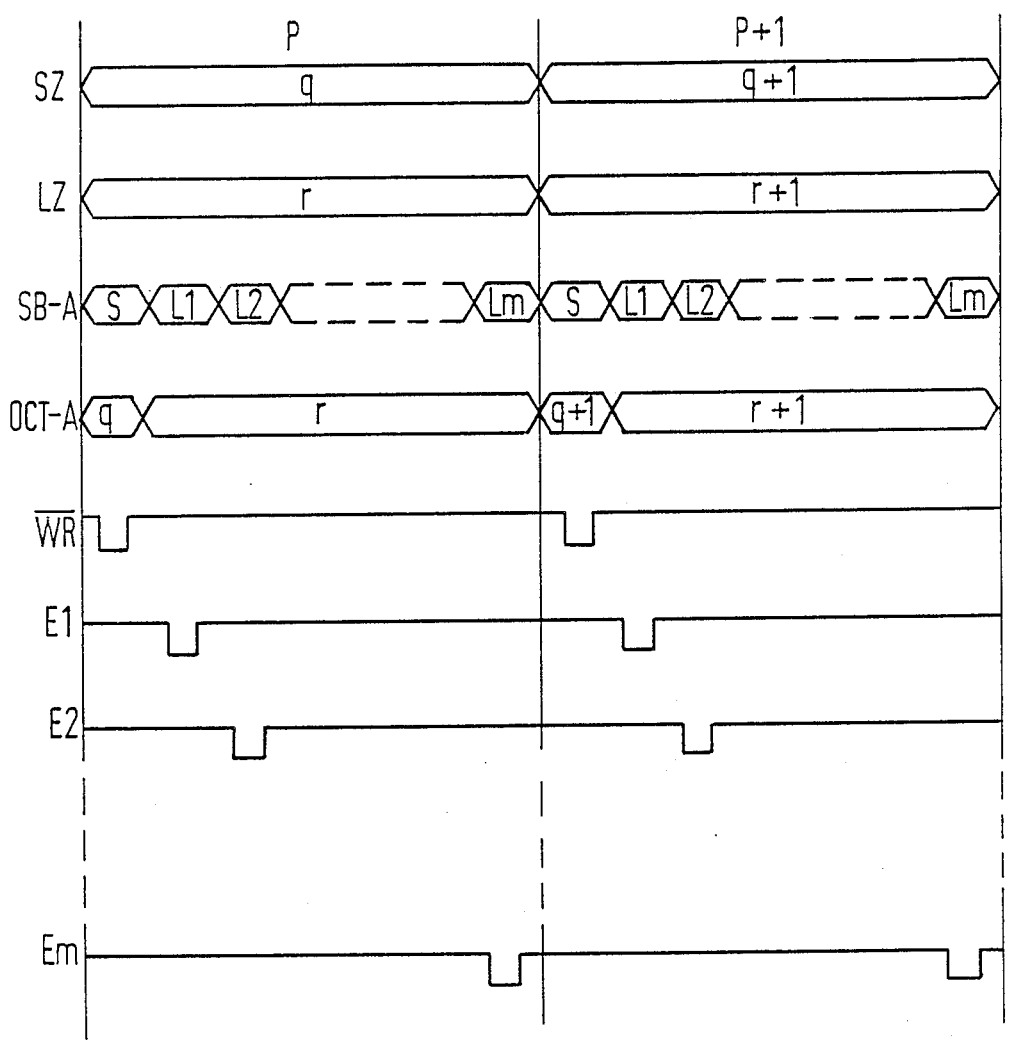
FIG. 3 is a timing diagram useful in understanding the operation of the coupling element illustrated in FIG. 1.

The remainder of the previously described control cycle is so defined that in each subcycle an 8 bit byte of a data packet occurring on multibit digital signal line E1 can also be written into the read-write memory RAM. This is apparent in the time diagram illustrated in FIG. 3. In FIG. 3, two successive subcycles p and p+1 are illustrated. The top line shows the current count q and q+1 of 8 bit byte counter SZ. The next line shows the current count r and r+1 respectively of 8 bit byte counter LZ. The next line shows the address signals occurring at the output terminals of section SB-A of the address multiplexer AM; and the next line shows the address signals occurring at the output terminals of section OCT-A of the address multiplexer AM. The relative position in time of a write pulse WR !! and setting signals E1 to Em occurring on line configuration S are shown on the remaining lines.

In FIG. 4 a possible structure of the central control device ZST, as illustrated in FIG. 1, is represented in block diagram form. In FIG. 4, the central control device includes a microprocessor MP1 to whose bus system two interface devices P5 and P6, and a storage arrangement comprising a memory M1 and a read-write memory PS-M are connected. The interface device P5 is provided for a data exchange with the buffer storage control devices PSS1 to PSSn via the bus line system BUS3. Via the interface device P6, in contrast, the central control device ZST is in connection with bus line systems BUS1 and BUS2.

Memory M1 functions in known manner as working and program storage. The above described control of the transmission of data packets waiting in the individual buffer stores (PS1 to PSn) takes place with the aid of store PS-M. Store PS-M has storage areas 1 to n corresponding to the n buffer stores PS1 to PSn. Each of these store areas is subdivided into k+1 storage cells corresponding to the data packets storable in the buffer stores. The first k storage cells provide storage for the address signals included with the data packets supplied by the particular buffer store control device. For this storage, which may be carried out, for example, according to a list of free storage cells maintained in store M1, a cell part, denoted by ADR, is provided in each of the k storage cells. In a further cell part, denoted by RF, the sequence of arrival of the individual address signals and, hence, the sequence of the data packets received into the particular buffer store is marked. This sequence is updated with each read and write by address signals, for example, according to a known concatenation principle.

In the last of the k+1 storage cells of a storage area the instantaneous state of occupancy of the particular storage area and, hence, the state of occupancy of the particular buffer store is stored.

On the basis of the information deposited in the just described storage PS-M the microprocessor associated with the central control device ZST selects, at successive intervals, n data packets for further routing to the n output terminals of the space switch RK. As a function of the work-load of the individual output terminals of the space switch, up to m data packets stored in the same buffer storage may be taken into consideration. After such a selection, subsequently, a setting of the space switch RK in the above stated manner and a routing of control data signals to the possible buffer store control devices takes place.

What we claim is:

1. A switching node for switching data signals transmitted in data packets each of which includes an address signal, said switching node comprising:
    at least one coupling element which has a plurality n of input lines and a plurality n of output lines selectably coupled to said input lines via a space switch; and
    a plurality n of buffer stores each being respectively connected between a particular one of said input lines and said space switch, and in each of which a plurality k of data packets occurring sequentially on the particular input line are storable before being routed further to an output line indicated by the address signal contained in the particular data packet, wherein:
    said space switch has a plurality m×n of input terminals connected respectively to the corresponding m output terminals of said n buffer stores, and a plurality n of output terminals connected respectively to said n output lines; and
    the buffer stores each have a plurality m−k of output terminals connected respectively to the corresponding m input terminals of said space switch for each particular buffer store via which m data packets stored in the particular buffer store can be routed further to m different output lines by being simultaneously suppliable to the m input terminals of said space switch.

2. The switching node of claim 1, further comprising a plurality of buffer store control devices, respectively associated with each of the buffer stores, which controls the reception of data packets into free storage areas of the associated buffer store and the transmission of data packets to the space switch according to the output lines of the coupling element available for switching.

3. The switching node of claim 2, further comprising:
    a central control device; wherein:
    each of said plurality of buffer store control devices, when receiving a data packet into a free storage area of the associated buffer store, supplies information identifying this storage area and the address signal included in the received data packet to the central control device; and
    the central control device, according to the information supplied to it by the individual buffer store control devices at given time intervals, selects n data packets for switching and sets the space switch appropriately, and supplies to the buffer store control devices information regarding those storage areas of the associated buffer store in which the data packets to be transmitted are stored as well as information regarding the output terminal of the associated buffer store to be used for transmitting the data packets.

* * * * *